United States Patent
Gibbs et al.

(10) Patent No.: US 7,712,715 B2
(45) Date of Patent: May 11, 2010

(54) CLAMPING ARRANGEMENT FOR A CONVEYOR SEAL

(75) Inventors: Aaron T. Gibbs, Easton, PA (US); George T. Mott, Alburtis, PA (US)

(73) Assignee: Asgco Manufacturing, Inc., Allentown, PA (US)

( * ) Notice: Subject to any disclaimer, the term of this patent is extended or adjusted under 35 U.S.C. 154(b) by 0 days.

(21) Appl. No.: 12/206,256

(22) Filed: Sep. 8, 2008

(65) Prior Publication Data

US 2009/0212183 A1 Aug. 27, 2009

Related U.S. Application Data

(60) Provisional application No. 61/031,181, filed on Feb. 25, 2008.

(51) Int. Cl.
*A47B 96/06* (2006.01)
(52) U.S. Cl. .................................. 248/229.12
(58) Field of Classification Search .............. 248/229.1, 248/229.11, 229.12, 229.14, 229.15, 226.11; 198/836.1, 836.3, 836.4; 298/836.1, 836.3, 298/836.4
See application file for complete search history.

(56) References Cited

U.S. PATENT DOCUMENTS

| | | | |
|---|---|---|---|
| 2,593,610 A | 4/1952 | Roberts | |
| 2,749,068 A * | 6/1956 | Wayman | 248/72 |
| 4,231,471 A | 11/1980 | Gordon | |
| 4,236,628 A | 12/1980 | Stahura | |
| 4,436,446 A | 3/1984 | Gordon | |
| 4,874,082 A | 10/1989 | Swinderman | |
| 4,877,125 A | 10/1989 | Gordon | |
| 4,989,727 A | 2/1991 | Gordon | |
| 5,016,747 A | 5/1991 | Veenhof | |
| 5,048,669 A | 9/1991 | Swinderman | |
| 5,154,280 A | 10/1992 | Mott | |
| 5,267,642 A | 12/1993 | Gharpurey et al. | |
| 5,303,813 A | 4/1994 | de Rooy | |
| 5,513,743 A | 5/1996 | Brink | |

(Continued)

FOREIGN PATENT DOCUMENTS

AU 2001-35202 10/2001

(Continued)

OTHER PUBLICATIONS

ASGCO Manufacturing, Inc., "Clamp Mount™ Skirt Sealing Systems", © Jun. 2008, 2 pages.

(Continued)

*Primary Examiner*—Ramon O Ramirez
(74) *Attorney, Agent, or Firm*—Clement A. Berard, Esq.; Dann, Dorfman, Herrell & Skillman, PC (57) ABSTRACT

A clamping arrangement may comprise a support having a base and an extension, a clamping member having a body, a clamping edge and one or more engaging features for engaging the support extension. The body may have a hole in which a fastener may be disposed when the clamping member engages the extension of the support. A stud and nut or a bolt may provide the fastener for moving the clamping member for applying a clamping force. The body may have an opening for engaging the extension of the support when the clamping member is in a certain position.

25 Claims, 9 Drawing Sheets

U.S. PATENT DOCUMENTS

| | | | |
|---|---|---|---|
| 5,774,951 | A | 7/1998 | Close |
| 5,913,404 | A | 6/1999 | Bowman |
| 6,269,943 | B1 | 8/2001 | Mott |
| 6,471,171 | B1 * | 10/2002 | VanderVelde .......... 248/229.12 |
| 6,547,062 | B2 | 4/2003 | Wiggins |
| 6,550,798 | B2 * | 4/2003 | MacKarvich ............ 280/149.2 |
| 6,557,697 | B1 | 5/2003 | Bowman |
| 6,575,294 | B1 | 6/2003 | Swinderman et al. |
| 6,763,935 | B2 | 7/2004 | Ostman |
| 6,802,483 | B1 * | 10/2004 | Leasure ................. 248/229.15 |
| 7,258,228 | B1 | 8/2007 | Herren |

FOREIGN PATENT DOCUMENTS

| | | |
|---|---|---|
| JP | 07-277463 | 10/1995 |
| JP | 10-152214 | 6/1998 |
| JP | 2001-233432 | 8/2001 |

OTHER PUBLICATIONS

ASGCO Manufacturing, Inc., "Manufacturing Products Division", © 2008, 7 pages.

Patent Cooperation Treaty, "International Search Report", PCT/US2009/034469, Sep. 25, 2009, 3 pages.

\* cited by examiner

CLAMPING ARRANGEMENT FOR A CONVEYOR SEAL

This Application claims the benefit of U.S. Provisional Application No. 61/031,181 filed Feb. 25, 2008, which is hereby incorporated herein by reference in its entirety.

The present invention relates to a clamping arrangement and, in particular, to a clamping arrangement useful with a conveyor.

In the loading area of an endless conveyor belt used to convey bulk materials, such as coal, stone, grain, and the like, the material would spill from the edges of the moving belt and would present a problem by requiring clean-up and by loss of material. This spillage may be substantially reduced by incorporating an enclosed structure above the belt with side walls extending down to be in close proximity of the surface of the belt. The gap between the bottom of the vertical side walls and the moving conveyor belt should typically increase along the direction that the belt is moving. The increasing gap will prevent material from lodging between the belt and the rigid wall. Because the rigid side walls would damage the belt if they come into contact with the belt surface, it is common practice to attach a resilient secondary seal to the outside surface of the rigid side walls and to allow sliding contact between the secondary seal and the conveyor belt. The side wall is sometimes referred to as a skirt.

Replacing the secondary seal is a common maintenance task, and there is a need for a convenient and easily usable clamping arrangement for the secondary seal.

A clamping arrangement may comprise a support having a base and an extension, a clamping member having a body, a clamping edge and one or more engaging features for engaging the support extension. The body may have a hole in which a threaded member may be disposed when the clamping member engages the extension of the support; and a nut or a bolt may provide the threaded member for moving the clamping member for applying a clamping force. The body may have an opening for engaging the extension when the clamping member is in a certain position.

BRIEF DESCRIPTION OF THE DRAWING

The detailed description of the preferred embodiment(s) will be more easily and better understood when read in conjunction with the FIGURES of the Drawing which include.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED EMBODIMENT(S)

Figure 1:
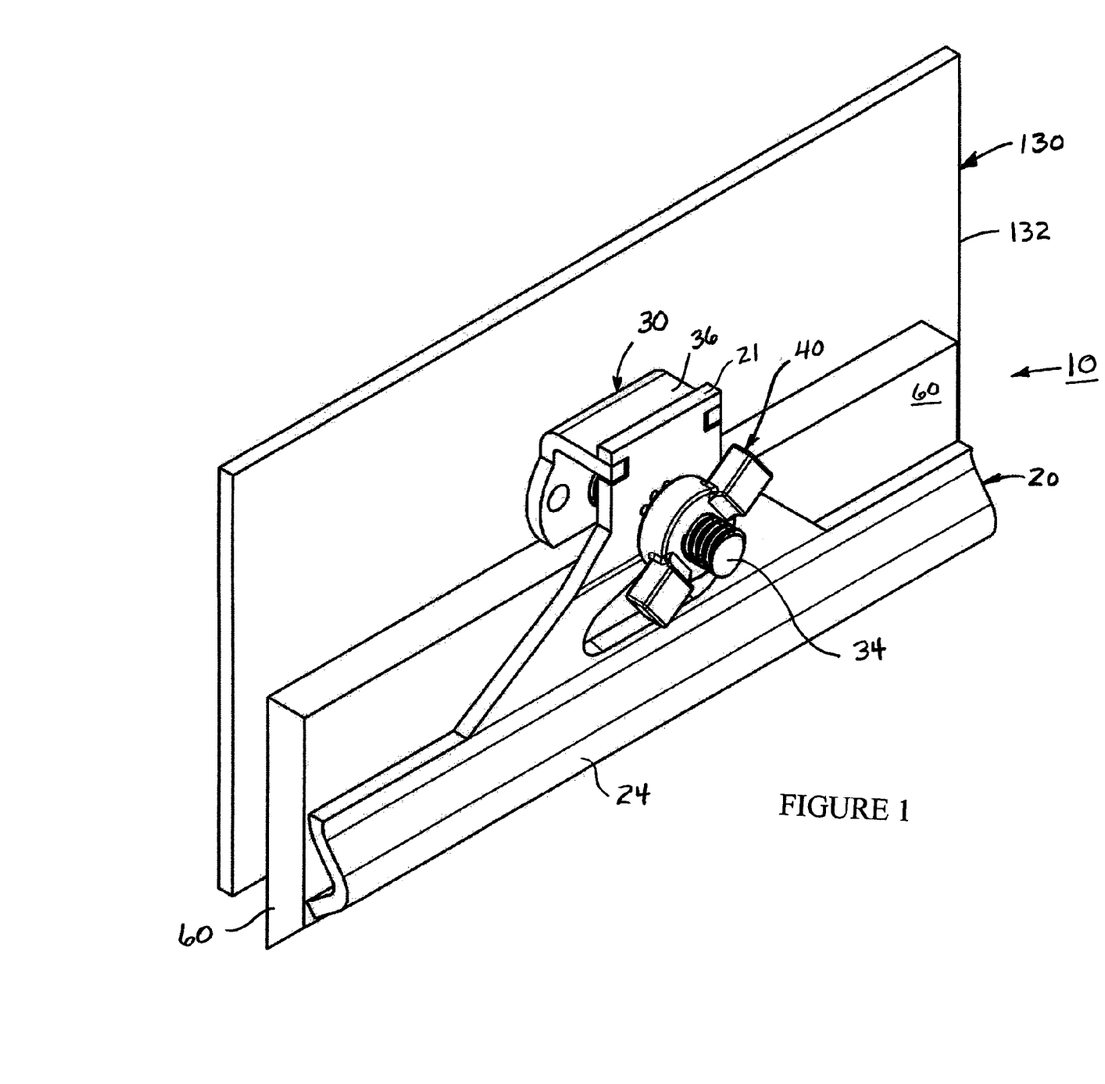
FIG. 1 is an isometric representation of an example clamping arrangement holding a section of a secondary seal against a side wall structure.

The present clamping arrangement 10 provides a new and improved clamping arrangement 10 for clamping a seal 60, e.g., a resilient secondary seal, to a structure 130, e.g., to a structure and/or an outer surface of a rigid primary skirt seal 130. Clamping force is applied to clamping member 20 by tightening a particular nut 40 that is designed to lock into position when rotated, e.g., by being struck with a hammer on one or more specially designed extensions or by being turned by a wrench engaging the one or more specially designed extensions. Locking of nut 40 is preferably provided by detents 25, 45 which act to resist rotation of nut 40, e.g., due to vibration. Reversing the rotation of nut 40 will reduce the clamping force to partially or fully release the force applied via the clamping member 20 to allow for vertical or other adjustment of the position of the secondary seal 60, or for replacement of the secondary seal 60. Clamping member 20 is supported by a clamp support 30 which may provide an anti rotation feature 38, 39, a covering part 36 to reduce material and debris from contacting the external adjustment threads 34, and provide a stable position for clamping member 20 when it is disengaged from seal 60. Adjustment nut 40 has extensions 46 facilitating it being rotated with a hammer or an adjustable wrench. Clamping member 20 may be rotated 180 degrees about threaded stud 34 when nut 40 is loosened, thereby providing a temporary stowage position facilitating replacement of secondary seal FIG. 1 is an isometric representation of an example clamping arrangement 10 holding a section of a secondary seal 60 against a side wall structure 130. Clamping arrangement 10 comprises clamping member or clamp plate 20, clamp support or keeper 30 and clamp nut 40. Clamp support 30 is mounted to structure 130, e.g., a side wall of skirt 132 or other structure 130 associated with a conveyor, and has a threaded stud 34 extending therefrom. Clamping member 20 is placed onto threaded stud 34 and nut 40 is threaded (tightened) thereon, thereby to press the elongated edge 24 of clamping member 20 towards clamp support 30 and structure 130, whereby seal 60 is captured between structure 130 and edge 24 of clamping member 20 and is clamped adjacent structure 130. Clamping member 20 has an upper end 21 that includes engaging features, e.g., projections and/or notches, that engage corresponding engaging features, e.g., projections and/or notches, of extension 36 of clamp support 30.

Figure 2:
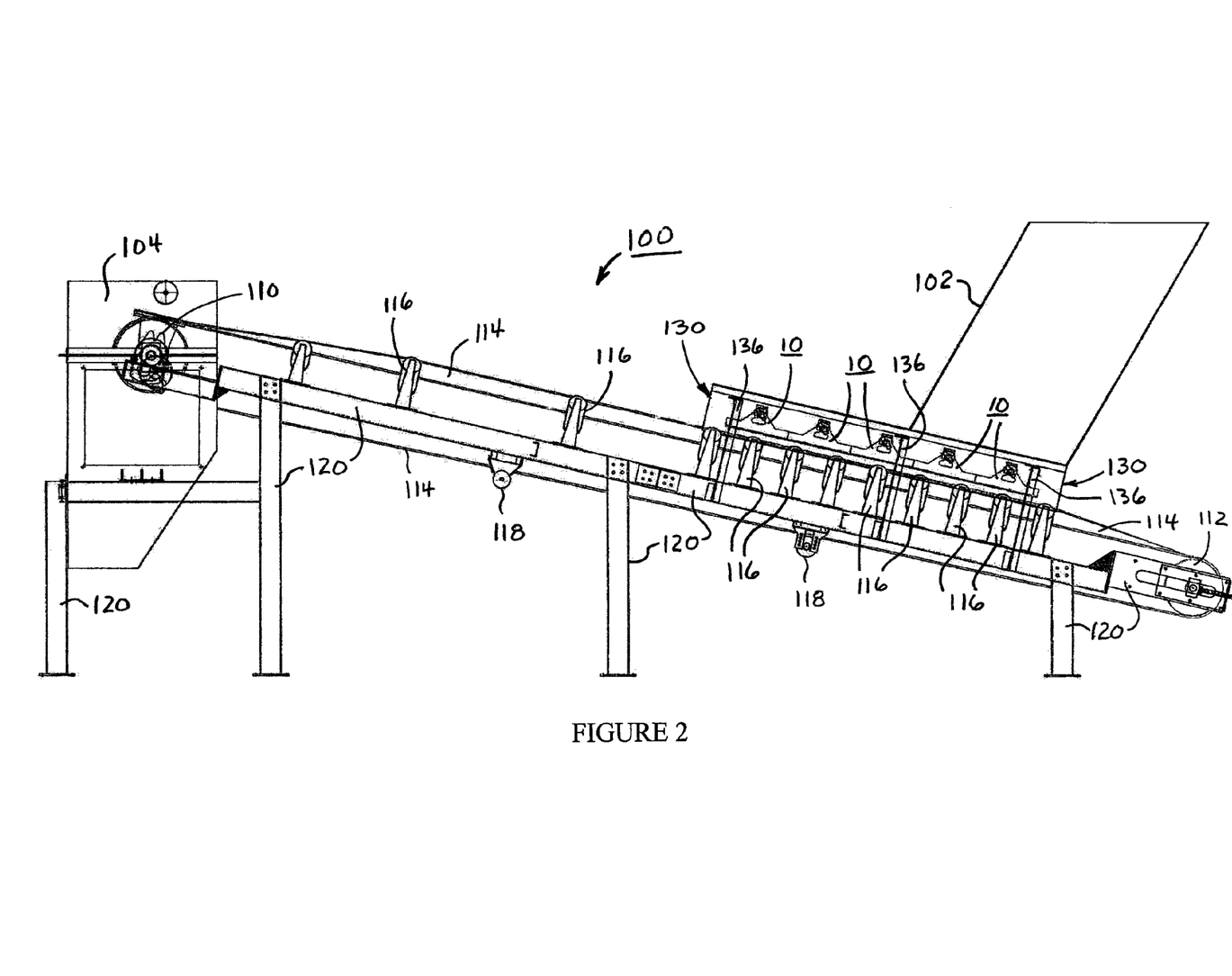
FIG. 2 is a side elevation view of an example conveyor system.
Figure 3:
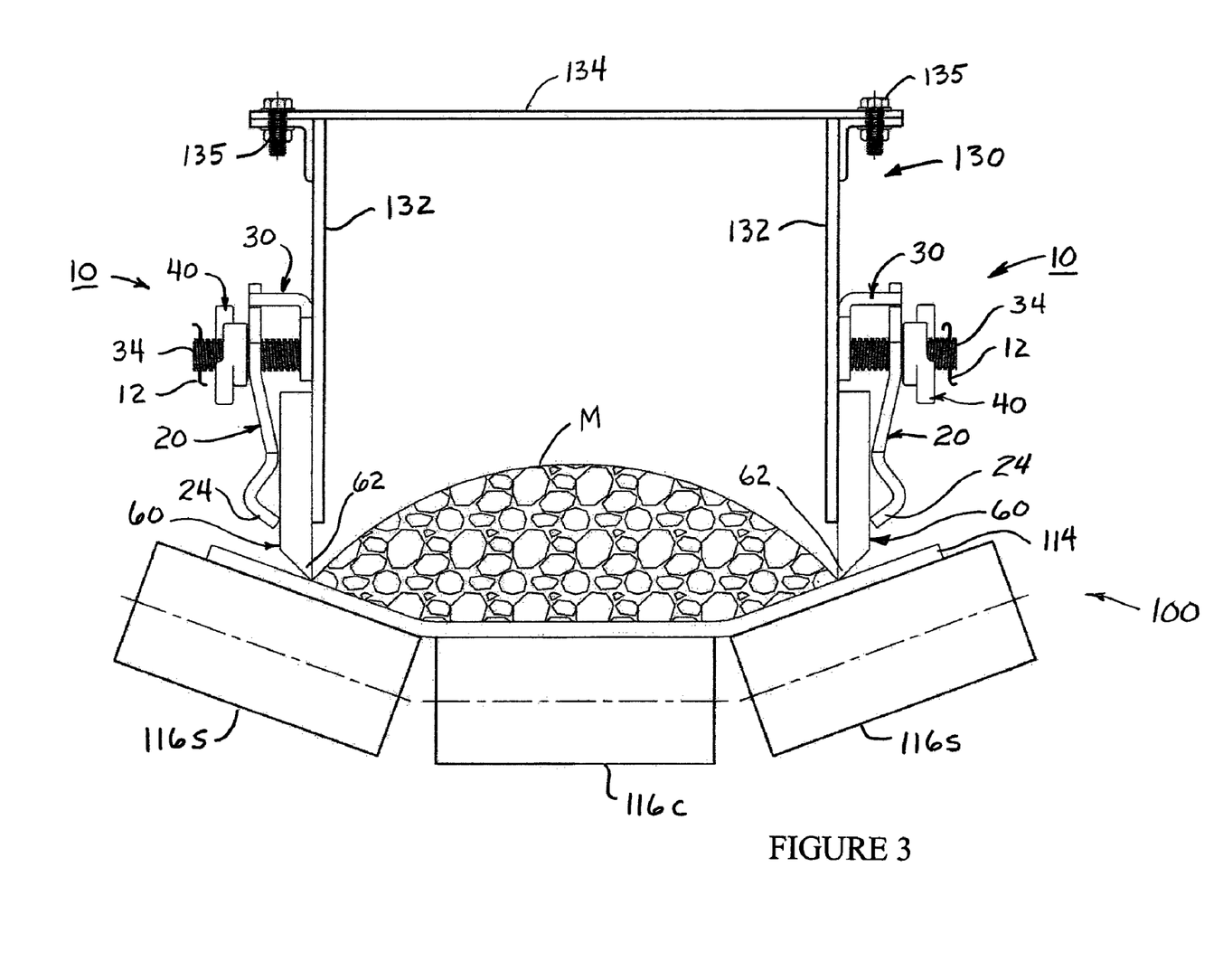
FIG. 3 is a cross section view of an example conveyor system.

FIG. 2 is a side elevation view and FIG. 3 is a cross section view of example conveyor system 100. Conveyor 100 has a powered (driven) head pulley 110, a tail pulley 112 and a conveyor 114, e.g., belt 114, there around for conveying material M in the direction from tail pulley 112 towards head pulley 110. Conveyor 100 receives material M at loading chute 102 onto belt 114, moves material M towards head pulley 110 and discharges material M into discharge chute 104. Conveyor 100 includes a supporting structure or frame 120 of any convenient arrangement for holding pulleys 110, 112, and belt 114, and other elements of conveyor 100 in desired locations.

Belt 114 is supported in its upper or material carrying direction by a plurality of support rollers 116 spaced apart along support frame 120, including ones of support rollers 116 that are more closely spaced in a loading region proximate loading chute 102. Support rollers 116 may include plural rollers 116c, 116s, e.g., a relatively horizontal central roller 116c and two inclined side rollers 116s that are inclined towards central roller 116 thereby to shape belt 114 into a generally U-shaped cross-sectional shape whereby material M tends to be loaded to a greater extent in a central region, e.g., a region supported by central roller 116. Belt 114 is supported in its lower or return direction by a plurality of support rollers 118 that are spaced apart along the underside of support frame 120.

Because material M falling at loading chute 102 onto belt 114 imposes an impact load and tends to disperse when it lands on belt 114, support rollers 116 are more closely spaced proximate loading chute 102 and a primary skirt 130 is provided to reduce the sidewards movement of material M landing on belt 114. Primary skirt 130 typically includes generally rigid side walls 132 typically made of a metal plate, e.g., a steel plate, serving as a primary seal and a cover 134 also typically made of a metal plate, e.g., a steel plate, that may be attached to side walls 132, e.g., by sets of bolts and nuts 135. Primary skirt 130 is typically supported as may be convenient, e.g., by support members 136 extending from conveyor support frame 120.

The lower edges of rigid side walls 132 of primary skirt 130 are typically spaced apart from conveyor belt 114 so that skirt walls 132 do not score, gouge or otherwise damage belt 114, however, material M may escape through the slits or gaps between skirt side walls 132 and belt 114. Such slit or gap may be closed by a secondary seal 60 or secondary skirt 60 that is made of a resilient material so that it may contact belt 114 without inflicting damage to belt 114. Seal 60 may have a beveled edge 62 proximate belt 114, or may have another desired shape. Secondary seal 60 may be in one piece or in several sections, and may be held in position against skirt wall 132 and adjacent belt 114 by one or more clamping arrangements 10, as illustrated.

Because secondary seal 60 contacts belt 114 and material M which often may be a coarse, gritty and/or abrasive material, it will cause seal 60 to wear due to frictional contact and a gap of undesirable magnitude will develop over time and use between seal 60 and belt 114. Typically, seal 60 may be adjusted periodically, e.g., on a regular schedule or on an as needed basis, to re-position seal 60 to be in contact with or almost in contact with belt 114, and may be relatively large and relatively heavy.

Typical example seals 60 are about 6-8 inches in height, range in thickness from about ¼ inch to one inch, and are typically provided in rolls of about 25-50 foot lengths. These rolls are relatively large and relatively heavy, but typically can be moved by one or two people. Because a 50-foot long seal can be awkward and/or difficult to install, position, remove, adjust, and/or re-position, the rolled seal material is typically cut into about 10-12 foot long sections before installation. Seals 60 are typically of a natural rubber or a synthetic rubber, but may be made of a UHMW urethane or other suitable material. Seals 60 are typically provided in standard thicknesses, e.g., thicknesses of about ¼ inch, ½ inch, ¾ inch, and one inch, and can also be supplied in other desired thicknesses.

It is seen that clamping arrangement 10 may be supported by side wall 132 of primary skirt 130 by clamp support 30 being attached thereto, or to any other suitable structure or frame. Clamp support 30 has a threaded stud 34 extending therefrom in a direction generally perpendicular to sidewall 132, and clamping member 20 is clamped thereto by nut 40 being threaded onto stud 34. As adjustment nut 40 is tightened, clamp edge 24 of clamping member 20 is moved towards seal 60 using a fulcrum provided by the interface between the upper end of clamping member 20 and the outer end of clamp support 30. As nut 40 is tightened, clamp edge 24 moves inward to where it comes into contact with seal 60 and applies a clamping force thereto to securely clamp seal 60 against sidewall 132. A pin or wire 12 may be provided through threaded stud 34 after nut 40 is threaded thereon, so as to provide a safety against accidental or unwanted loss or removal of nut 40.

Figure 4:
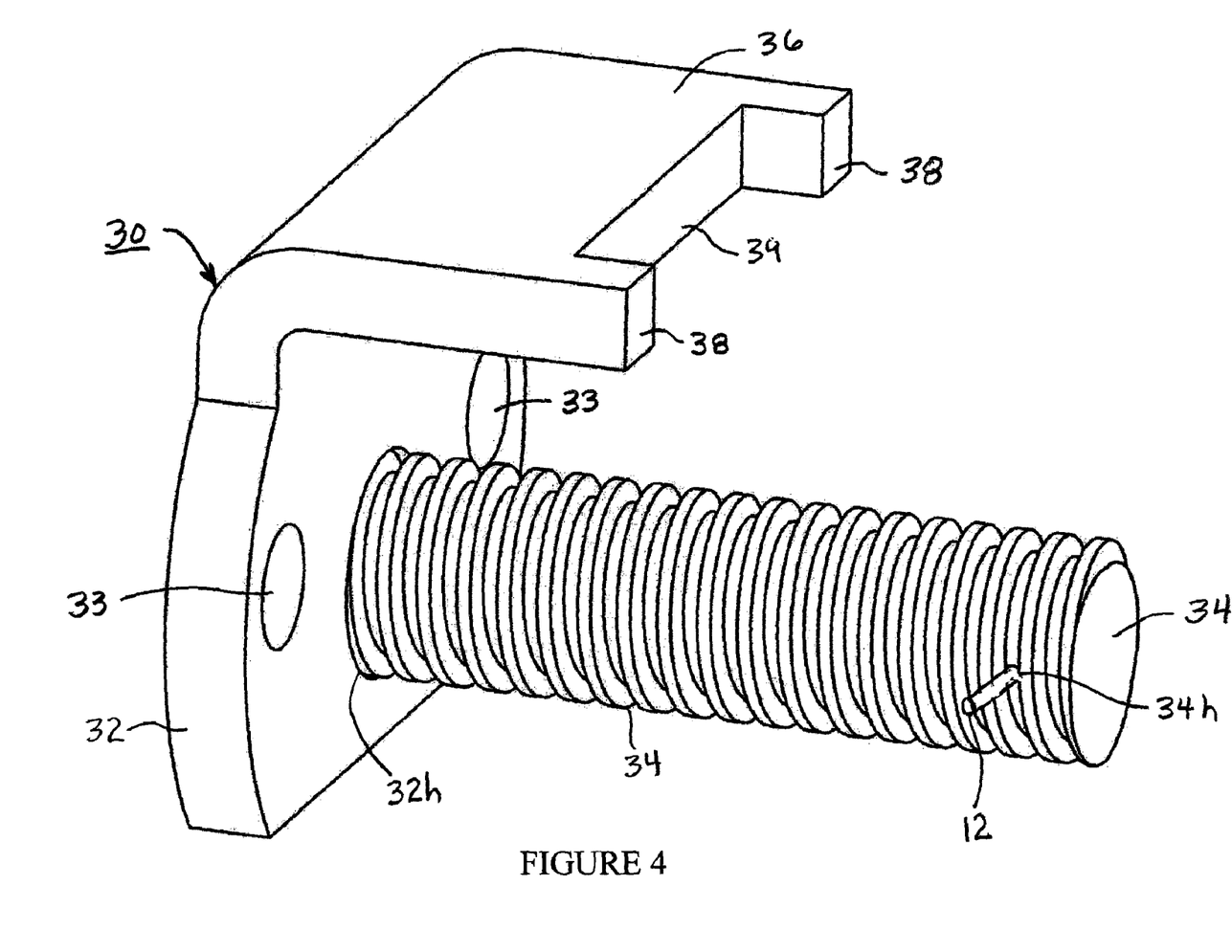
FIG. 4 is an isometric view of an example clamp support suitable for the example clamping arrangement.

FIG. 4 is an isometric view of an example clamp support 30 suitable for the clamping arrangement 10. Clamp support 30 includes a base 32 or attachment plate 32 which is useful for attaching support 30 to a supporting structure, e.g., to side wall 132, to primary seal 130, or to another suitable structure, e.g., by bolts passing through mounting holes 33 to a threaded hole or to a nut. Externally threaded stud 34 extends generally perpendicularly from base 32 in the same direction as extension 36 and has a length greater than the distance that extension 36 extends generally perpendicularly from base 32. Typically, threaded stud 34 is longer than the length of extension 36 plus the thickness of clamping member 20 plus the thickness of nut 40. Threaded stud 34 is threaded into and secured in threaded hole 32h of base 32 by being wedged on tapered threads, by adhesive, by a spot weld, by being peened, or by any other suitable means.

Threaded stud 34 may have one or more transverse holes 34h near the end thereof distal from base 32 for receiving pin or wire 12 therethrough after nut 40 is threaded thereon, to prevent unwanted loss or removal of nut 40. Pin 12 may be a cotter pin, a spring clip, a spring pin, a safety wire, or any other suitable pin or wire.

Extension 36 of clamp support 30 preferably includes one or more features at the outward end thereof for engaging the normally upward end of clamping member 20. Typically these engaging features include one or more projections 38 and one or more grooves or notches 39 which correspond to engaging features of clamping member 20. Engaging features 38, 39 engage corresponding features of clamping member 20 to maintain clamping member 20 and clamp support 30 in desired relative positions, e.g., positions that resist or preclude rotation of clamping member 20 about threaded stud 34, thereby to maintain a desired positional relationship between clamping member 20 and resilient secondary seal 60. Engagement features 38, 39 preferably also provide support for clamping member 20 so that it does not rest on the threads of stud 34 and also facilitate the installation of clamping member 20 and it being secured by clamp nut 40 threaded on stud 34.

Figure 5:
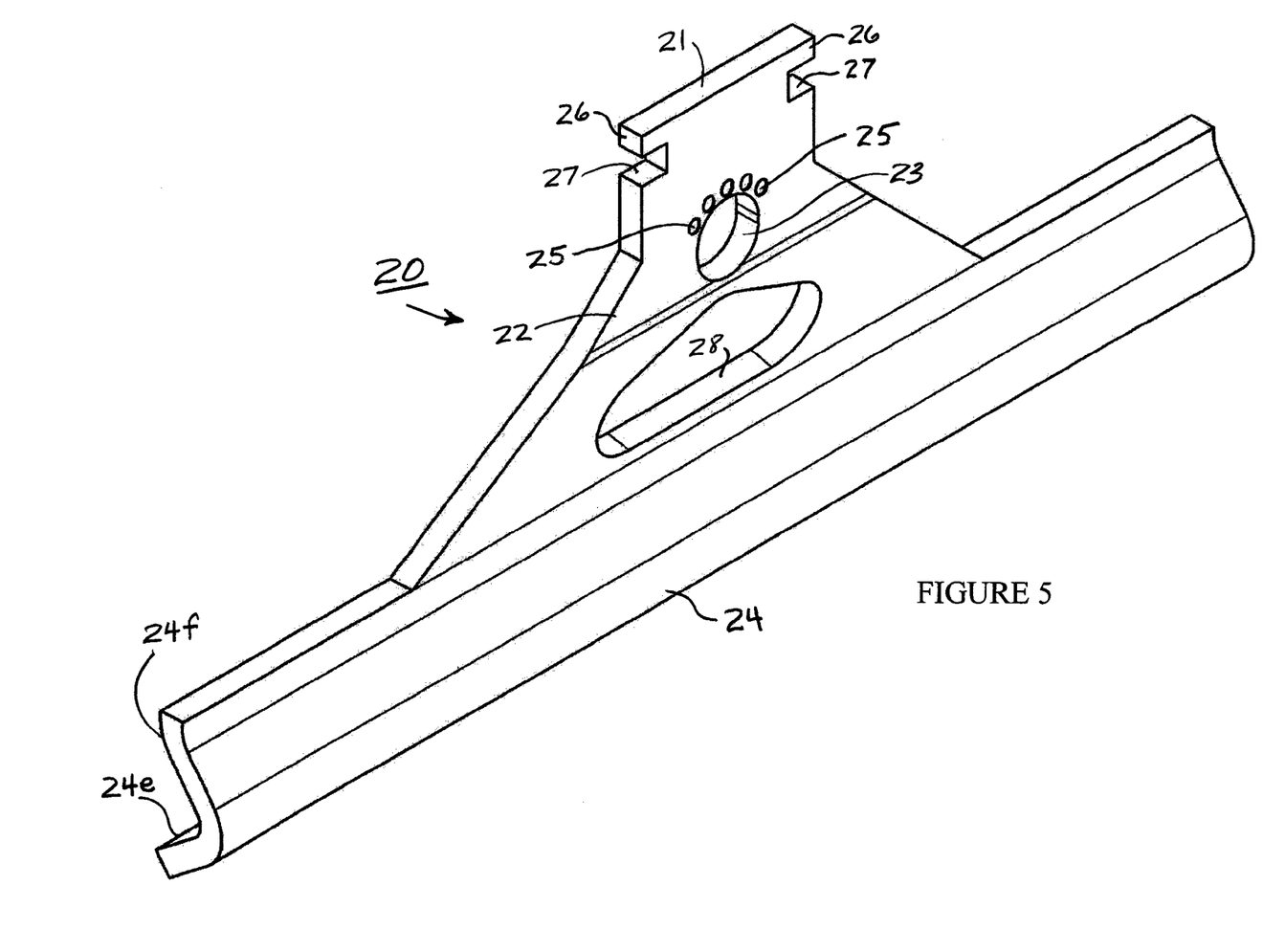
FIG. 5 is an isometric view of an example clamping member of the example clamping arrangement.

FIG. 5 is an isometric view an example clamping member 20 of clamping arrangement 10. Clamping member 20 is a clamp plate 20 that is formed and shaped to provide desired features for making contact with clamp support 30, with clamp and adjustment nut 40 and with seal 60. Clamping member 20 has a web or body 22 at one end of which is an elongated clamping edge 24 intended to make contact with a seal 60 along a relatively long region. Clamping edge 24 is preferably curved so as to provide a relatively pointed edge 24e that provides the primary contact with seal 60, which is desirable for securely engaging seal 60, particularly where seal 60 includes a resilient and/or deformable material, although a broader contact edge 24 could also be suitable. Where a relatively thicker seal 60 is clamped, the upper edge 24f of clamping edge 24 may also come into contact with seal 60, e.g., as may be the case in FIGS. 2 and 7A.

At the end 21 of body 22 opposite from clamping edge 24 is an arrangement of features for contacting with, and preferably engaging, corresponding features of clamp support 30 which preferably supports clamping member 20 thereon. Support notches 27 define projections 26 and notches 27 that engage clamp support 30, e.g., projections 38 and alignment recess 39 of extension 36 of clamp support 30, so that the part of body 22 between notches 27 is disposed in recess 39 of clamp support 30, and so clamping member 20 and clamp support 30 are aligned and maintained in a non-rotating relationship when clamping member 20 is secured thereon, e.g., by clamp nut 40 being tightened on threaded stud 34 of clamp support 30. It is noted that with clamping member hanging from projections 38 of support 30 by support notches 27 engaging support projections 38, clamping member 20 may hang supported by support 30 while nut 40 is threaded onto stud 34, thereby facilitating the installation and securing of clamping member 20, and of a seal 60, e.g., between clamp plate 20 and sidewall 132.

Hole 23 in body 22 is provided to receive threaded stud 34 therethrough when clamping member 20 is positioned on clamp support 30, e.g., engaging extension 36 thereof. Body 22 preferably has a plurality of detents 25 around hole 23 for engaging corresponding detents of clamp nut 40 when clamp nut 40 is tightened on threaded stud 34. Detents 25 may be, e.g., projections or recesses, whichever complements the corresponding detent features 45 of clamp nut 40.

Clamping member 20 also preferably has an opening 28 in the central region of body 22 thereof which is positioned and of a size that extension 36 of clamp support 30 will be disposed therein when clamping member 20 is on clamp support 30 in an inverted position, i.e. a position inverted from the position in which clamping member 20 clamps seal 60, and with threaded stud 34 passing through hole 23. Opening 28 is sometimes referred to as a reverse locking opening because it may be utilized for maintaining clamping member 20 in a position reversed from the position in which it clamps seal 60. While the shape of body 22, e.g., a generally rectangular shape proximate end 21 and an elongated shape proximate clamp edge 24, and a generally trapezoidal section therebetween joining end 21 and clamp edge 24, is thought desirable from the standpoint of distributing clamping forces and loads, it also facilitates providing opening 28 in the trapezoidal section of body 24, thereby to provide a beneficial and convenient operating feature for clamp 10.

Thus, in installing a seal 60, in changing a seal 60 or in adjusting to the position of a seal 60, clamp nut 40 may be loosened on or removed from stud 34 and clamping member 20 may be moved away from clamp support 30 (e.g., to disengage notches 27 and projections 38) and be rotated about threaded stud 34 by 180 degrees so that opening 28 is proximate to extension 36, and then clamping member 20 may be moved towards clamp support 30 so that extension 36 comes within opening 28, whereby clamping member 20 hangs in an inverted position; in addition, clamp nut 40 may be tightened (e.g., hand tightened) to maintain clamping member 20 in the inverted position on clamp support 30 thereby to allow for easier placement and/or removal of seal 60.

Figure 6A:
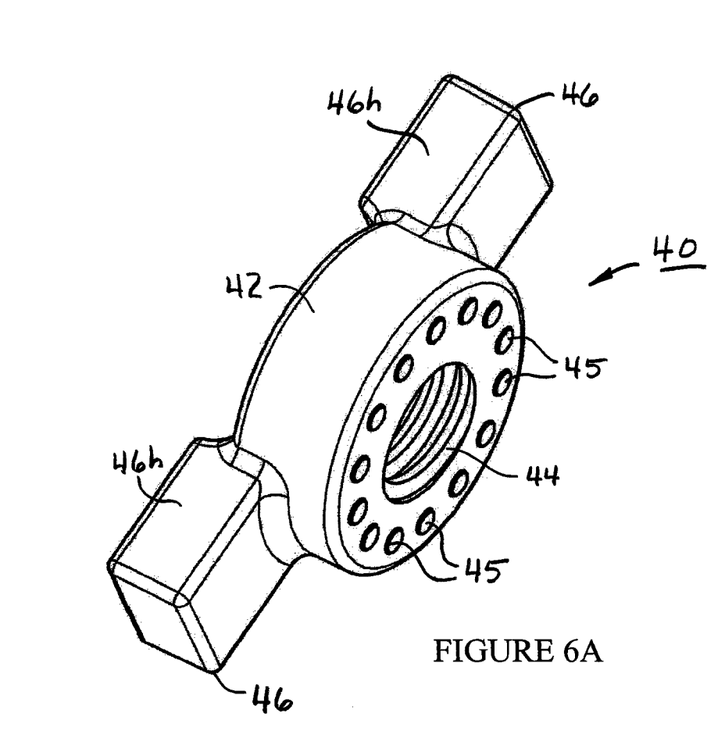
FIGS. 6A and 6B are isometric views showing the opposing end surfaces, respectively, of an example clamp nut of the example clamping arrangement.
Figure 6B:
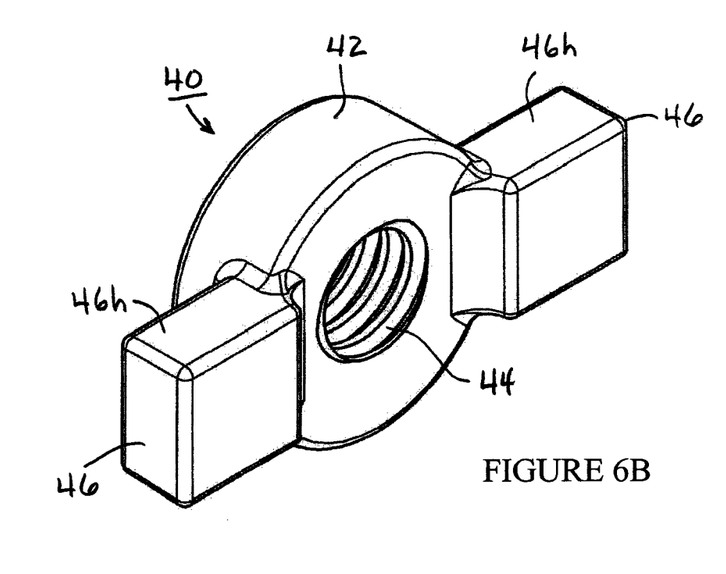

FIGS. 6A and 6B are isometric views of the opposing surfaces, respectively, of an example clamp nut 40 of the subject arrangement. Clamp nut 40 has a generally cylindrical body 42 having a threaded central hole 44 therethrough which is threadable on threaded stud 34 of clamp support 30. Surrounding hole 44 are a plurality of detents 45 that may be projections or recesses complementing the detents 25 of clamping member 20 with which they are to engage to provide a detent action that will tend to resist the rotation of clamp nut 40 when nut 40 is tightened on threaded stud 34, e.g., rotation due to vibration and/or other disturbances. As is apparent, the radius of detents 45 from the axis of hole 44 is preferably substantially the same as the radius of detents 25 about the axis of hole 23 of clamping member 20.

In a preferred clamp nut 40, extending radially from cylindrical body 42 are a pair of radial extensions or lugs 46 about 180 degrees apart that provide features to which a wrench or a hammer may be applied for exerting tightening and/or loosening rotational forces on clamp nut 40. Typically, extensions 46 are rectangular in shape, but other shapes may be employed. With the example rectangular extensions 46 illustrated, both wrench extensions 46 would typically be engaged by a wrench or surface 46h thereof may be struck with a hammer for rotating clamp nut 40 on threaded stud 34. Thus, extensions 46 are preferably substantial so as to withstand the forces of the wrench and/or hammer.

While clamp nut 40 is illustrated as having a face with detents 45 intended to make contact with clamping member 20 and engage detents 25 thereof, and so nut 40 is to be threaded onto stud 34 in a preferred orientation. Alternatively, cylindrical body 42 may be extended axially so that extension lugs 46 are axially intermediate the opposing circular faces thereof, and detents 45 may be provided on both faces of cylindrical body 42, whereby clamp nut 40 may be threaded onto threaded stud 34 in either orientation.

Detents 45 of clamp nut 40 may be depressions or projections and the corresponding detents 25 of clamping member 20 may be projections or depressions, respectively. In one preferred example embodiment, clamp nut 40 has "nubs" or projections 45 and clamping member 20 has depressions 25. Typically, generally spherical depressions and projections are provided, however, many other shapes are likewise suitable. Detents 25 and detents 45 are preferably arranged in respective circular patterns that are centered on and are coaxial with the axis of hole 24 and the axis of threaded hole 44, respectively, wherein the circles of both have substantially the same radius. Typically, that radius is selected for suitably locating detents 45 on a desired circle on an end face of cylindrical body 42 of nut 40.

Similarly, adjacent ones of detents 25, 45 are displaced around the circle by substantially the same angular amount so that all of detents 25 can engage all of detents 45, although fewer than all of detents 45 will have a corresponding detent 25 with which to engage in the example illustrated. For example, with a full circle including 14 detents as illustrated for clamp nut 40, the detents 45 are spaced at about 25.7 degree intervals, as are the corresponding detents 25 of clamping member 20. Any suitable number and spacing of detents 25, 45 may be utilized. The number of detents 25, 45 provided may be enough for a full circle thereof, as illustrated for example nut 40, or may be enough for only a partial circle thereof, as illustrated for example clamping member 20.

Figure 7A:
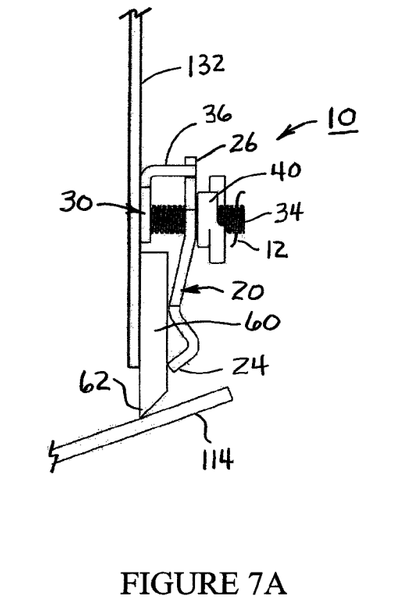
FIGS. 7A, 7B and 7C are side views of the example clamping arrangement clamping secondary seals of different thicknesses.
Figure 7B:
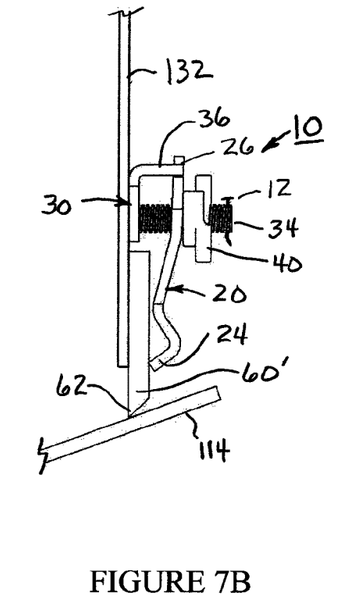
Figure 7C:
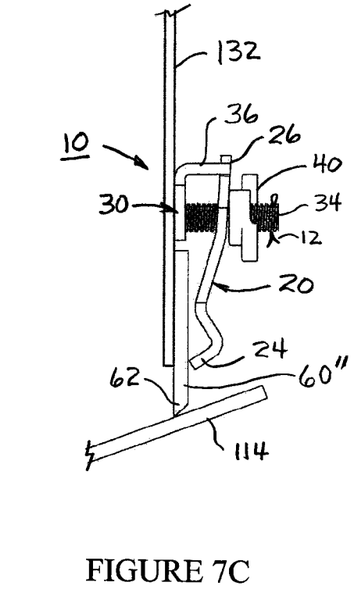

FIGS. 7A, 7B and 7C are side views of the example clamping arrangement 10 clamping secondary seals 60, 60', 60" of different thicknesses to structure 132, e.g., primary skirts 132. It is also seen therein that extension 36 of support 30 engages clamping member 20 near projections 26 to provide a fulcrum thereat about which clamping member 20 may be moved by clamp nut 40 being tightened on threaded stud 34 for applying a clamping force to seal 60 to press seal 60 against structure 132. As is seen in the three illustrations, seals 60 of thicknesses differing by as much as two times, or more, may be secured by clamping arrangement 10.

Typically, secondary seals 60 have a beveled edge 62 for contacting conveyor belt 114, and as that edge 62 wears, seal 60 may be repositioned by loosening clamp nut 40 to release the clamping force applied by clamping member 20, repositioning seal 60, and then tightening clamp nut 40 to again cause clamping member 20 to apply clamping force to seal 60.

Typically, clamping member 20, clamp support 30, and clamp nut 40 are steel, but they may be aluminum or stainless steel or other suitable material. In one example embodiment, support 30 is steel, clamping member 20 is aluminum, and nut 40 is stainless steel.

Figure 8A:
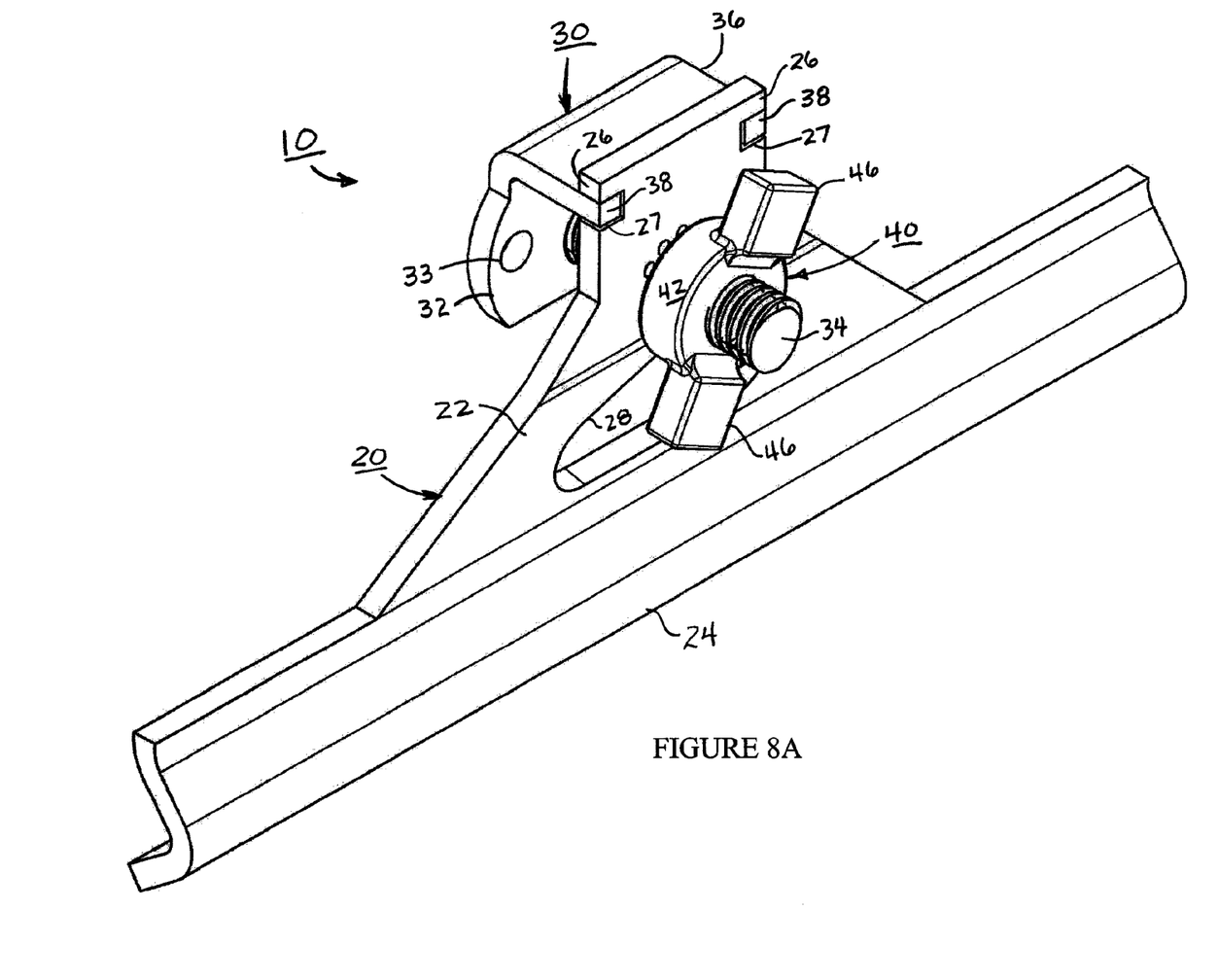
FIGS. 8A and 8B are isometric views of the assembled example clamping arrangement in an operating position and in an inverted stowage or "change out" position, respectively.
Figure 8B:
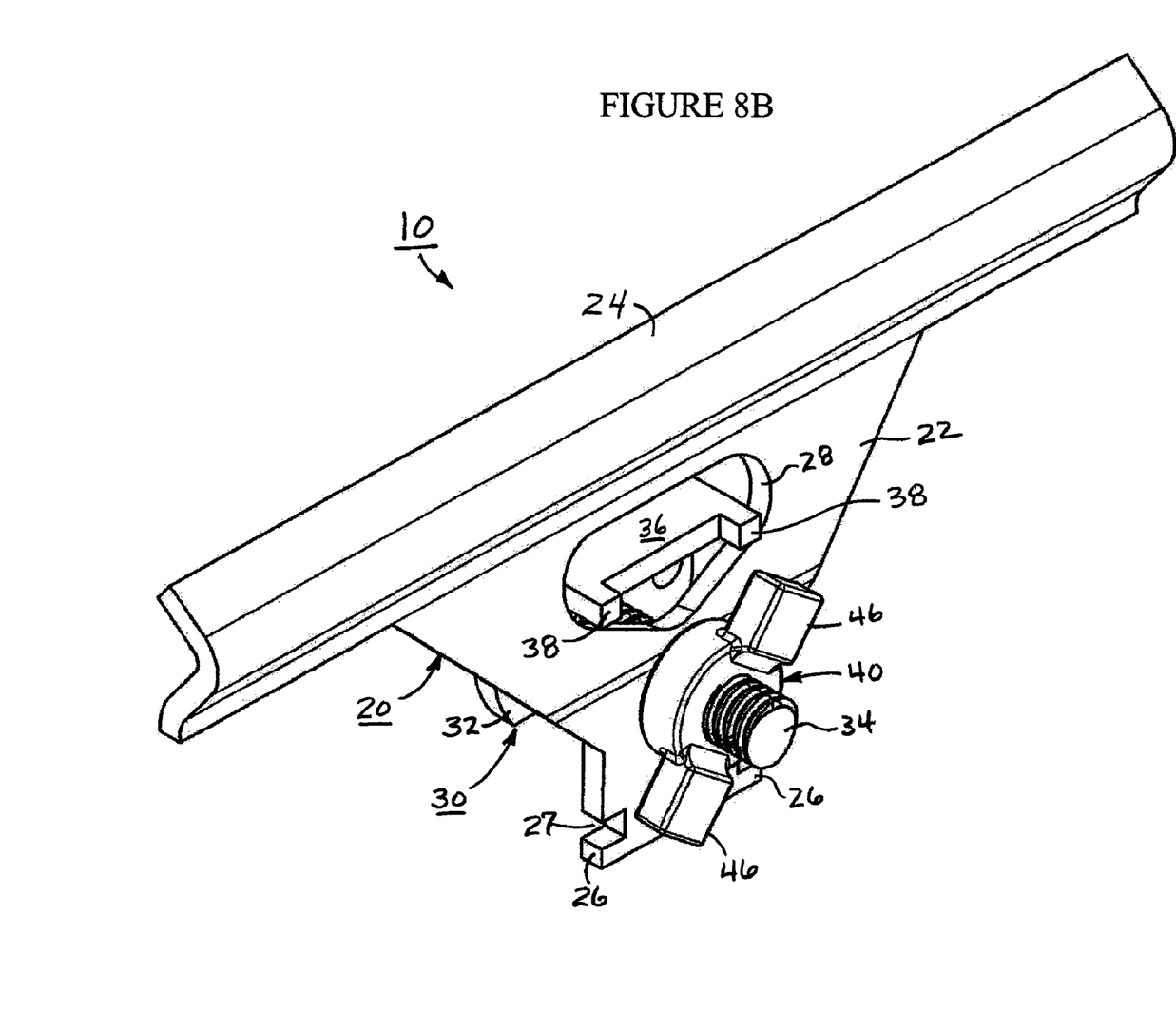

FIGS. 8A and 8B are isometric views of the assembled clamp arrangement 10 in an operating position for clamping a seal 60 and in an inverted stowage or "change out" position, respectively. In the operating position shown in FIG. 8A, clamping member 20 is supported by clamp support 30 with projections 38 of extension 36 engaging notches 27 of clamping member 20, with threaded stud 34 disposed in hole 23 of clamping member 20, and with clamp nut 40 threaded on stud 34 for causing clamping member 20 to move towards clamp support 30, thereby to apply clamping force to a seal to be clamped. Typically, clamp support 30 would be mounted to a structure, e.g., a structure 132, by bolts (not shown) through holes 33 therein.

In the stowage or seal "change-out" position shown in FIG. 8B, clamping member 20 is inverted from the position of FIG. 8A and is also supported by clamp support 30 with threaded stud 34 disposed in hole 23 of clamping member 20, and with clamp nut 40 threaded on stud 34 for causing clamping member 20 to move towards clamp support 30, thereby to move extension 36 of clamp support 30 into opening 28 of clamping member 20 so that rotation of clamping member 20 relative to clamp support 30 is limited, whereby clamping member 20 is maintained substantially in the position shown whereby clamping edge 24 is above stud 34 and not in the region where a seal 60 would be, thereby to provide increased clearance for easing the removal and/or installation of a seal.

It is noted that in the preferred arrangement illustrated, clamping member 20 is supported by extension 36 of clamp support 30 in both the operating position and in the change out position, thereby to reduce contact between clamping member 20 and threaded stud 34 which contact could cause wear or damage to the threads of threaded stud 34 over time and use.

A clamping arrangement 10 may comprise a support 30 having a base 32, an extension 36 extending from the base 32, and a threaded stud 34 extending from the base 32; a clamping member 20 having a body 22 having a hole 23 therein, having a clamping edge 24 at one end of the body 22 and having one or more engaging features 26, 27 at the opposite end of the body 22 for engaging the extension 36 of the support 30, wherein the threaded stud 34 is disposed in the hole 23 when the engaging features 26, 27 of the clamping member 20 engage the extension 36 of the support 30; and a nut 40 for engaging the threaded stud 34 for moving the clamping member 20 towards the base 32 of the support 30 for applying clamping force to a seal 60 adjacent the clamping member 20. Extension 36 of the support 30 and the engaging features 26, 27 of the clamping member 20 may include complementary projections 26, 38 and notches 27, 39 for engaging each other. Clamping member 20 may not rest on the threaded stud 34 when the complementary engaging features 26, 27, 38, 39 of the extension 36 of the support 30 and of the clamping member 20 engage each other. Clamping member 20 may be supported by the support 30 when the complementary engaging features 26, 27, 38, 39 of the extension 36 of the support 30 and of the clamping member 20 engage each other. Clamping member 20 may have an opening 28 in the body 22 thereof, and clamping member 20 may be placed in a position wherein the threaded stud 34 is disposed in the hole 23 in the body 22 of the clamping member 20 and the extension 36 of the support 30 is disposed in the opening 28 in the body 22 of the clamping member 20. Clamping member 20 may be rotated about the threaded stud 34 between a position wherein the engaging features of the clamping member 20 engage the extension 36 of the support 30 and the position wherein the extension 36 of the support 30 is disposed in the opening 28 in the body 22 of the clamping member 20 without removing the nut 40 from the threaded stud 34. Nut 40 may include one or more radial extensions 46 for rotating the nut 40 by a hammer or by a wrench; or a plurality of detents 45 for engaging corresponding detents 25 of the clamping member 20; or one or more radial extensions 46 for rotating the nut 40 by a hammer or by a wrench and a plurality of detents 45 for engaging corresponding detents 25 of clamping member 20. Clamping arrangement 10 may further comprise a pin 12 through an end 34h of the threaded stud 34 distal the base 32 of the support 30 for preventing the nut 40 from coming off the threaded stud 34. Threaded stud 34 may include a threaded bolt 34, 40 threadable into a threaded hole 32h in the base 32 of the support 30 and having a bolt head that provides the nut 40.

A clamping arrangement 10 may comprise: a support 30 having a base 32 and an extension 36 extending from the base 32; a clamping member 20 having a body 22 having a hole 23 therein, having a clamping edge 24 at one end of the body 22 and having one or more engaging features 26, 27 at the opposite end of the body 22 for engaging the extension 36 of the support 30, wherein the hole 23 is disposed adjacent the base 32 of the support 30 when the engaging features 26, 27 of the clamping member 20 engage the extension 36 of the support 30; and means 34, 40 extending through the hole 23 in the body 22 of the clamping member 20 for moving the clamping member 20 towards the base 32 of the support 30 for applying clamping force to an object 60 adjacent the clamping member 20. The means 34, 40 extending through the hole 23 in the body 22 of the clamping member 20 may include: a threaded stud 34 extending from the base 32 of the support 30 and a nut 40 engaging the threaded stud 34 for moving the clamping member 20 towards the base 32 of the support 30; or a threaded bolt 34, 40 extending through the hole 23 in the body 22 of the clamping member 20 to engage a threaded hole 32h in the base 32 of the support 30. The clamping arrangement 10 may further comprise a pin 12 through an end 34h of the threaded stud 34 distal the base 32 of the support 30 for preventing the nut 40 from coming off the threaded stud 34. Extension 36 of the support 30 and the engaging features 26, 27 of the clamping member 20 may include complementary projections 26, 38 and notches 27, 39 for engaging each other. Clamping member 20 need not rest on the means 34, 40 for moving the clamping member 20 when the complementary engaging features 26, 27, 38, 39 of the extension 36 of the support 30 and of the clamping member 20 engage each other. Clamping member 20 may be supported by the support 30 when the complementary engaging features 26, 27, 38, 39 of the extension 36 of the support 30 and of the clamping member 20 engage each other. Clamping member 20 may have an opening 28 in the body 22 thereof wherein the clamping member 20 may be placed in a position wherein the means 34, 40 for moving the clamping member 20 is disposed in the hole 23 in the body 22 of the clamping member 20 and the extension 36 of the support 30 in disposed in the opening 28 in the body 22 of the clamping member 20. Clamping member 20 may be rotated about the means 34, 40 for moving the clamping member 20 between a position wherein the engaging features 26, 27 of the clamping member 20 engage the extension 36 of the support 30 and the position wherein the extension 36 of the support 30 is disposed in the opening 28 in the body 22 of the clamping member 20 without removing the means 34, 40 for moving the clamping member 20.

A clamping arrangement 10 may comprise: a support 30 having a base 32 with first and second ends, the support 30 having an extension 36 extending generally perpendicularly from the first end of the base 32, wherein the extension 36 has at least one projection 38 and at least one recess 39 near an end thereof distal the base 32; a clamping member 20 having a body 22 with first and second ends, the clamping member 20 having an elongated clamping edge 24 extending from the first end of the body 22 and having at least one recess 27 and at least one projection 26 at the second end of the body 22 for engaging the at least one projection 38 and at least one recess 39 of the extension 36 of the support 30, whereby the clamping member 20 is supported by the extension 36 of the base 32 when the at least one recess 27 and at least one projection 26 at the second end of the body 22 engage the at least one projection 38 and at least one recess 39 of the extension 36 of the support 30; and a fastener 34, 40 for moving the body 22 of the clamping member 20 toward the base 32 of the support 30 when the clamping member 20 is positioned with the at least one recess 27 and at least one projection 26 thereof engaging the at least one projection 38 and at least one recess 39 of the extension 36 of the support 30, whereby an object 60 may be clamped by the elongated clamping edge 24 of the clamping member 20 when the fastener 34, 40 is tightened to move the clamping member 20 towards the base 32 of the support 30. Fastener 34, 40 may comprise a threaded fastener 34 engaging the body 22 of the clamping member 20 and the base 32 of the support 30. Threaded fastener 34, 40 may comprise: a threaded stud 34 extending from the base 32 of the support 30 through a hole 23 in the body 22 of the clamping member 20 and a nut 40 threaded on the threaded stud 34; or a threaded bolt 34, 40 extending through a hole 23 in the body 22 of the clamping member 20 and threadingly engaging the base 32 of the support 30. The clamping arrangement 10 may further comprise an elongated seal 60 clamped by the elongated clamping edge 24 of the clamping member 20 when the fastener 34, 40 is tightened to move the clamping member 20 towards the base 32 of the support 30. Support 30 may be attached to a skirt 130, 132, wherein the elongated seal 60 may be clamped between the elongated clamping edge 24 of the clamping member 20 and the skirt 130, 132 when the fastener 34, 40 is tightened to move the clamping member 20 towards the base 32 of the support 30. Extension 36 of the support 30 may have two spaced apart projections 38 defining therebetween the recess 39 for receiving the first end of the body 22 of the clamping member 20, and the first end of the body 22 of the clamping member 20 may have two spaced apart recesses 27 located for receiving the two projections 38 of the extension 36 of the support 30. Body 22 of the clamping member 20 may have an opening 28 therein proximate the second end thereof, and wherein the opening 28 is sized for receiving the extension 36 of the support 30 therein for supporting the support 30 when the support 30 is in an inverted position relative to its clamping position. Body 22 of clamping member 20 may have a plurality of detent features 25 therein, and fastener 34, 40 may have a plurality of detent features 45 therein that are complementary to the detent features 25 of clamping member 20, and the detent features 45 of the fastener 34, 40 may engage the detent features 25 of the clamping member 20.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

In a typical conveyor belt system 100 for conveying particulate material, a rigid primary seal 130 is mounted between the inboard loading zone and an outboard region of the belt 114 at which the particulate matter is not desirable. A flexible or resilient secondary seal 60 may be attached to the outside surface of the primary seal 132 with a clamping arrangement 10 that includes a threaded stud 34 and nut 40 arrangement that adjustably exerts a force on the clamping member 20 to hold the secondary seal 60 in place. The body 42 of the nut 40 may be circular and may have one or more extensions 46 that can be used to rotate the nut, e.g., using a hammer or a wrench. The clamping member 20 can be rotated and maintained in a reversed (inverted) position to allow ease of secondary seal 60 replacement.

A secondary skirt seal clamping arrangement 10 is described wherein clamping force on a seal 60 is created by rotating a nut 40 on a screw 34. The nut 40 may have one or more radial extensions 46 for being rotated by hammer blows or by a wrench. A keeper 30 supports clamping member 20 vertically, so that clamping member 20 does not rest on the screw threads 34 and does not rotate with the nut 40. The nut 40 preferably has raised nubs 45 on the back side that engage into matching indentations 25 on the surface of clamping member 20 which lock the nut 40 and clamping member 20 together restricting movement between the two surfaces. An opening 28 in clamping member 20 is designed to fit over the support extension 36 of support 30 when clamping member 20 is rotated 180 degrees to keep clamping member 20 in the rotated position to facilitate changing of the secondary seal 60. A safety pin 12 may be provided through a hole near the end of screw thread 34 to prevent nut 40 from coming off of screw 34. Clamping arrangement 10 is designed to accept different thicknesses of secondary seal 60.

While the present invention has been described in terms of the foregoing example embodiments, variations within the scope and spirit of the present invention as defined by the claims following will be apparent to those skilled in the art. For example, clamping arrangement 10 may be used to clamp any desired object, not just a resilient secondary seal as in the example embodiment described. The seal clamped by arrangement 10 need not be resilient, or flexible, and need not be secondary, but may be rigid and/or of any thickness, size and/or shape. Arrangement 10 need not be attached to a primary skirt 130 as in the example embodiment, but may be attached to any suitable support.

Threaded stud 34 and nut 40 could be replaced by a bolt that passes through clamping member 20 and threads into a threaded hole 32$h$ in clamp support 30 in substantially the location where stud 34 extends from. Such bolt could include, e.g., radial lugs similar to lugs 46 of nut 40 so that such bolt could be tightened and loosened using a hammer or a wrench. Further, the bolt could include detents on the surface of its bolt head that contacts clamping member 20, e.g., similar to detents 45 of nut 40, to reduce the likelihood of it loosening due to vibration and the like. Alternatively, a locking washer could be employed.

While seal 60 is illustrated as being somewhat longer than is the clamping edge 24 of clamping member 20 in FIG. 1, as might be a desirable arrangement, seal 60 may be substantially longer than is clamping edge 24, and two or more clamping arrangements 10 may be employed to secure such a longer seal, e.g. one example of which is illustrated in FIG. 2. In addition, clamp arrangements 10 may be in close longitudinal proximity as illustrated in FIG. 2 or may be spaced apart as may be desired or convenient in a particular installation.

While clamp nut 40 is shown with two extensions 46 about 180 degrees apart, clamp nut 40 may have one, two, three, four or more extensions 46 typically evenly spaced about the cylindrical body 42 thereof, and the extensions 46 may be of like size and shape, or may be of different size and shape. Having one extension slightly smaller or larger, or of a different shape may be helpful, e.g., to indicate to an operator how much nut 40 has rotated.

Either or both of pin 12 and nut 40 may have a retaining chain or cable attached at one end to pin 12 or nut 40 and at the other end to support 30 or another fixed structure, so that pin 12 and/or nut 40 do not get lost when removed from clamping arrangement 10.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A clamping arrangement comprises:
   a support having a base, an extension extending from the base, and a threaded stud extending from the base;
   a clamping member having a body having a hole therein, having a clamping edge at one end of the body and having one or more engaging features at the opposite end of the body for engaging the extension of the support, thereby to define a fulcrum, wherein the threaded stud is disposed in the hole when the engaging features of the clamping member engage the extension of the support; and
   a nut for engaging the threaded stud for moving the clamping member about the fulcrum towards the base of the support for applying clamping force to a seal adjacent the clamping member.

2. The clamping arrangement of claim 1 wherein the extension of the support and the engaging features of the clamping member include complementary projections and notches for engaging each other.

3. The clamping arrangement of claim 1 wherein the nut includes:
   one or more radial extensions for rotating the nut by a hammer or by a wrench; or
   a plurality of detents for engaging corresponding detents of the clamping member; or
   one or more radial extensions for rotating the nut by a hammer or by a wrench and a plurality of detents for engaging corresponding detents of the clamping member.

4. The clamping arrangement of claim 1 wherein the threaded stud includes a threaded bolt threadable into a threaded hole in the base of the support and having a bolt head that provides the nut.

5. A clamping arrangement comprises:
   a support having a base, an extension extending from the base, and a threaded stud extending from the base;
   a clamping member having a body having a hole therein, having a clamping edge at one end of the body and having one or more engaging features at the opposite end of the body for engaging the extension of the support, wherein the threaded stud is disposed in the hole when the engaging features of the clamping member engage the extension of the support; and
   a nut for engaging the threaded stud for moving the clamping member towards the base of the support for applying clamping force to a seal adjacent the clamping member,
   wherein the extension of the support and the engaging features of the clamping member include complementary projections and notches for engaging each other, and
   wherein the clamping member does not rest on the threaded stud when the complementary engaging features of the extension of the support and of the clamping member engage each other.

6. A clamping arrangement comprises:
   a support having a base, an extension extending from the base, and a threaded stud extending from the base;
   a clamping member having a body having a hole therein, having a clamping edge at one end of the body and having one or more engaging features at the opposite end of the body for engaging the extension of the support, wherein the threaded stud is disposed in the hole when the engaging features of the clamping member engage the extension of the support; and
   a nut for engaging the threaded stud for moving the clamping member towards the base of the support for applying clamping force to a seal adjacent the clamping member,
   wherein the extension of the support and the engaging features of the clamping member include complementary projections and notches for engaging each other, and
   wherein the clamping member is supported by the support when the complementary engaging features of the extension of the support and of the clamping member engage each other.

7. A clamping arrangement comprises:
   a support having a base, an extension extending from the base, and a threaded stud extending from the base;
   a clamping member having a body having a hole therein, having a clamping edge at one end of the body and having one or more engaging features at the opposite end of the body for engaging the extension of the support, wherein the threaded stud is disposed in the hole when the engaging features of the clamping member engage the extension of the support; and
   a nut for engaging the threaded stud for moving the clamping member towards the base of the support for applying clamping force to a seal adjacent the clamping member,
   wherein the clamping member has an opening in the body thereof, and wherein the clamping member may be placed in a position wherein the threaded stud is disposed in the hole in the body of the clamping member and the extension of the support is disposed in the opening in the body of the clamping member.

8. The clamping arrangement of claim 7 wherein the clamping member may be rotated about the threaded stud between a position wherein the engaging features of the clamping member engage the extension of the support and the position wherein the extension of the support is disposed in the opening in the body of the clamping member without removing the nut from the threaded stud.

9. A clamping arrangement comprises:
a support having a base, an extension extending from the base, and a threaded stud extending from the base;
a clamping member having a body having a hole therein, having a clamping edge at one end of the body and having one or more engaging features at the opposite end of the body for engaging the extension of the support, wherein the threaded stud is disposed in the hole when the engaging features of the clamping member engage the extension of the support;
a nut for engaging the threaded stud for moving the clamping member towards the base of the support for applying clamping force to a seal adjacent the clamping member; and
a pin through an end of the threaded stud distal the base of the support for preventing the nut from coming off the threaded stud.

10. A clamping arrangement comprises:
a support having a base and an extension extending from the base;
a clamping member having a body having a hole therein, having a clamping edge at one end of the body and having one or more engaging features at the opposite end of the body for engaging the extension of the support, thereby to define a fulcrum, wherein the hole is disposed adjacent the base of the support when the engaging features of the clamping member engage the extension of the support; and
means extending through the hole in the body of the clamping member for moving the clamping member about the fulcrum towards the base of the support for applying clamping force to an object adjacent the clamping member.

11. The clamping arrangement of claim 10 wherein the means extending through the hole in the body of the clamping member includes:
a threaded stud extending from the base of the support and a nut engaging the threaded stud for moving the clamping member towards the base of the support; or
a threaded bolt extending through the hole in the body of the clamping member to engage a threaded hole in the base of the support.

12. The clamping arrangement of claim 10 wherein the extension of the support and the engaging features of the clamping member include complementary projections and notches for engaging each other.

13. A clamping arrangement comprises:
a support having a base and an extension extending from the base;
a clamping member having a body having a hole therein, having a clamping edge at one end of the body and having one or more engaging features at the opposite end of the body for engaging the extension of the support, wherein the hole is disposed adjacent the base of the support when the engaging features of the clamping member engage the extension of the support; and
means extending through the hole in the body of the clamping member for moving the clamping member towards the base of the support for applying clamping force to an object adjacent the clamping member,
wherein the means extending through the hole in the body of the clamping member includes:
a threaded stud extending from the base of the support and a nut engaging the threaded stud for moving the clamping member towards the base of the support, and a pin through an end of the threaded stud distal the base of the support for preventing the nut from coming off the threaded stud, or
a threaded bolt extending through the hole in the body of the clamping member to engage a threaded hole in the base of the support.

14. A clamping arrangement comprises:
a support having a base and an extension extending from the base;
a clamping member having a body having a hole therein, having a clamping edge at one end of the body and having one or more engaging features at the opposite end of the body for engaging the extension of the support, wherein the hole is disposed adjacent the base of the support when the engaging features of the clamping member engage the extension of the support; and
means extending through the hole in the body of the clamping member for moving the clamping member towards the base of the support for applying clamping force to an object adjacent the clamping member,
wherein the extension of the support and the engaging features of the clamping member include complementary projections and notches for engaging each other, and
wherein the clamping member does not rest on the means for moving the clamping member when the complementary engaging features of the extension of the support and of the clamping member engage each other.

15. A clamping arrangement comprises:
a support having a base and an extension extending from the base;
a clamping member having a body having a hole therein, having a clamping edge at one end of the body and having one or more engaging features at the opposite end of the body for engaging the extension of the support, wherein the hole is disposed adjacent the base of the support when the engaging features of the clamping member engage the extension of the support; and
means extending through the hole in the body of the clamping member for moving the clamping member towards the base of the support for applying clamping force to an object adjacent the clamping member,
wherein the extension of the support and the engaging features of the clamping member include complementary projections and notches for engaging each other, and
wherein the clamping member is supported by the support when the complementary engaging features of the extension of the support and of the clamping member engage each other.

16. A clamping arrangement comprises:
a support having a base and an extension extending from the base;
a clamping member having a body having a hole therein, having a clamping edge at one end of the body and having one or more engaging features at the opposite end of the body for engaging the extension of the support, wherein the hole is disposed adjacent the base of the support when the engaging features of the clamping member engage the extension of the support; and
means extending through the hole in the body of the clamping member for moving the clamping member towards the base of the support for applying clamping force to an object adjacent the clamping member, wherein the clamping member has an opening in the body thereof, and wherein the clamping member may be placed in a position wherein the means for moving the clamping member is disposed in the hole in the body of the clamping member and the extension of the support is disposed in the opening in the body of the clamping member.

17. The clamping arrangement of claim 16 wherein the clamping member may be rotated about the means for moving the clamping member between a position wherein the engaging features of the clamping member engage the extension of the support and the position wherein the extension of the support is disposed in the opening in the body of the clamping member without removing the means for moving the clamping member.

18. A clamping arrangement comprises:
a support having a base with first and second ends, the support having an extension extending generally perpendicularly from the first end of the base, wherein the extension has at least one projection and at least one recess near an end thereof distal the base;
a clamping member having a body with first and second ends, the clamping member having an elongated clamping edge extending from the first end of the body and having at least one recess and at least one projection at the second end of the body for engaging the at least one projection and at least one recess of the extension of the support, thereby to define a fulcrum,
whereby the clamping member is supported by the extension of the base when the at least one recess and at least one projection at the second end of the body engage the at least one projection and at least one recess of the extension of the support; and
a fastener for moving the body of the clamping member about the fulcrum toward the base of the support when the clamping member is positioned with the at least one recess and at least one projection thereof engaging the at least one projection and at least one recess of the extension of the support,
whereby an object may be clamped by the elongated clamping edge of the clamping member when the fastener is tightened to move the clamping member towards the base of the support.

19. The clamping arrangement of claim 18 wherein the fastener comprises a threaded fastener engaging the body of the clamping member and the base of the support.

20. The clamping arrangement of claim 19 wherein the threaded fastener comprises:
a threaded stud extending from the base of the support through a hole in the body of the clamping member and a nut threaded on the threaded stud; or
a threaded bolt extending through a hole in the body of the clamping member and threadingly engaging the base of the support.

21. The clamping arrangement of claim 18 wherein the body of the clamping member has an opening therein proximate the second end thereof, and wherein the opening is sized for receiving the extension of the support therein for supporting the support when the support is in an inverted position relative to its clamping position.

22. A clamping arrangement comprises:
a support having a base with first and second ends, the support having an extension extending generally perpendicularly from the first end of the base, wherein the extension has at least one projection and at least one recess near an end thereof distal the base;
a clamping member having a body with first and second ends, the clamping member having an elongated clamping edge extending from the first end of the body and having at least one recess and at least one projection at the second end of the body for engaging the at least one projection and at least one recess of the extension of the support,
whereby the clamping member is supported by the extension of the base when the at least one recess and at least one projection at the second end of the body engage the at least one projection and at least one recess of the extension of the support; and
a fastener for moving the body of the clamping member toward the base of the support when the clamping member is positioned with the at least one recess and at least one projection thereof engaging the at least one projection and at least one recess of the extension of the support,
whereby an object may be clamped by the elongated clamping edge of the clamping member when the fastener is tightened to move the clamping member towards the base of the support, and further comprising:
an elongated seal clamped by the elongated clamping edge of the clamping member when the fastener is tightened to move the clamping member towards the base of the support.

23. The clamping arrangement of claim 22 wherein the support is attached to a skirt, and wherein the elongated seal is clamped between the elongated clamping edge of the clamping member and the skirt when the fastener is tightened to move the clamping member towards the base of the support.

24. A clamping arrangement comprises:
a support having a base with first and second ends, the support having an extension extending generally perpendicularly from the first end of the base, wherein the extension has at least one projection and at least one recess near an end thereof distal the base;
a clamping member having a body with first and second ends, the clamping member having an elongated clamping edge extending from the first end of the body and having at least one recess and at least one projection at the second end of the body for engaging the at least one projection and at least one recess of the extension of the support,
whereby the clamping member is supported by the extension of the base when the at least one recess and at least one projection at the second end of the body engage the at least one projection and at least one recess of the extension of the support; and
a fastener for moving the body of the clamping member toward the base of the support when the clamping member is positioned with the at least one recess and at least one projection thereof engaging the at least one projection and at least one recess of the extension of the support,
whereby an object may be clamped by the elongated clamping edge of the clamping member when the fastener is tightened to move the clamping member towards the base of the support, and
wherein the extension of the support has two spaced apart projections defining therebetween the recess for receiving the first end of the body of the clamping member, and wherein the first end of the body of the clamping member has two spaced apart recesses located for receiving the two projections of the extension of the support.

25. A clamping arrangement comprises:

a support having a base with first and second ends, the support having an extension extending generally perpendicularly from the first end of the base, wherein the extension has at least one projection and at least one recess near an end thereof distal the base;

a clamping member having a body with first and second ends, the clamping member having an elongated clamping edge extending from the first end of the body and having at least one recess and at least one projection at the second end of the body for engaging the at least one projection and at least one recess of the extension of the support, whereby the clamping member is supported by the extension of the base when the at least one recess and at least one projection at the second end of the body engage the at least one projection and at least one recess of the extension of the support; and a fastener for moving the body of the clamping member toward the base of the support when the clamping member is positioned with the at least one recess and at least one projection thereof engaging the at least one projection and at least one recess of the extension of the support, whereby an object may be clamped by the elongated clamping edge of the clamping member when the fastener is tightened to move the clamping member towards the base of the support, and wherein the body of the clamping member has a plurality of detent features therein, wherein the fastener has a plurality of detent features therein that are complementary to the detent features of the clamping member, and wherein the detent features of the fastener engage the detent features of the clamping feature.

* * * * *